(12) United States Patent
Hu et al.

(10) Patent No.: US 10,404,176 B2
(45) Date of Patent: Sep. 3, 2019

(54) SWITCHED CAPACITOR VOLTAGE CONVERTERS WITH CURRENT SENSE CIRCUITS COUPLED TO TANK CIRCUITS

(71) Applicant: TEXAS INSTRUMENTS INCORPORATED, Dallas, TX (US)

(72) Inventors: Zhiyuan Hu, Richardson, TX (US); Jian Liu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/944,623

(22) Filed: Apr. 3, 2018

(65) Prior Publication Data

US 2019/0115834 A1 Apr. 18, 2019

Related U.S. Application Data

(60) Provisional application No. 62/572,823, filed on Oct. 16, 2017.

(51) Int. Cl.
*H02M 3/07* (2006.01)
*H02M 3/158* (2006.01)

(52) U.S. Cl.
CPC .......... *H02M 3/1588* (2013.01); *H02M 3/07* (2013.01)

(58) Field of Classification Search
CPC .......... H02M 3/07; H02M 7/10; H02M 7/103; H02M 7/19; H02M 7/25
USPC ............... 363/59, 60; 307/109, 110; 327/56
See application file for complete search history.

(56) References Cited

U.S. PATENT DOCUMENTS

| 5,907,484 | A  | * | 5/1999  | Kowshik | ............... | H02M 3/073 307/110 |
|---|---|---|---|---|---|---|
| 8,619,445 | B1 | * | 12/2013 | Low | ........................ | H02M 1/32 363/59 |
| 10,027,223 | B1 | * | 7/2018  | Zhang | ...................... | H02M 3/07 |
| 2015/0077175 | A1 | * | 3/2015  | Giuliano | ................. | H02M 3/07 327/536 |
| 2017/0085172 | A1 | * | 3/2017  | Low | ......................... | H02M 3/07 |
| 2017/0170723 | A1 | * | 6/2017  | Low | ......................... | H02M 3/07 |
| 2018/0062507 | A1 | * | 3/2018  | Giuliano | ................. | H02M 3/07 |

* cited by examiner

*Primary Examiner* — Alex Torres-Rivera
(74) *Attorney, Agent, or Firm* — Tuenlap Chan; Charles A. Brill; Frank D. Cimino (57) ABSTRACT

A switched capacitor voltage converter comprises: an input port; an output port; a first control field-effect transistor (FET) comprising a first terminal coupled to the input port; a second control FET comprising a first terminal coupled to a second terminal of the first control FET; a first tank circuit coupled to the second terminal of the first control FET and to the first terminal of the second control FET; a first high-side sync FET comprising a first terminal coupled to the output port, a second terminal coupled to the first tank circuit; a first low-side sync FET comprising a first terminal coupled to the second terminal of the first high-side sync FET and to the first tank circuit; and a first current sense circuit coupled to the first tank circuit.

13 Claims, 4 Drawing Sheets

SWITCHED CAPACITOR VOLTAGE CONVERTERS WITH CURRENT SENSE CIRCUITS COUPLED TO TANK CIRCUITS

CROSS-REFERENCE TO RELATED APPLICATIONS

The present application claims priority to U.S. Provisional Patent Application No. 62/572,823, which was filed Oct. 16, 2017, is titled "Pre-Charge Circuit For Switching Converters And Methods Of Operating The Same," and is hereby incorporated herein by reference in its entirety.

BACKGROUND

Switched capacitor voltage converters are used to step up or step down an input direct current (DC) voltage (provided by a power source) to an output DC voltage applied to a load. In a step-down Dickson-type switched capacitor voltage converter having a step-down ratio of n-to-1, where n is an even integer, n control transistors and n-1 pairs of sync transistors are used with switching capacitors so that the output DC voltage is 1/n of the input DC voltage. Some Dickson-type switched capacitor voltage converters include LC resonant tank circuits to create a soft-switching condition to help reduce switching loss. An LC resonant tank circuit is also referred to as a tank circuit.

SUMMARY

In accordance with at least one example of the disclosure, a switched capacitor voltage converter comprises: an input port; an output port; a first control field-effect transistor (FET) comprising a first terminal coupled to the input port, a second terminal, and a gate; a second control FET comprising a first terminal coupled to the second terminal of the first control FET, a second terminal, and a gate; a first tank circuit coupled to the second terminal of the first control FET and to the first terminal of the second control FET; a first high-side sync FET comprising a first terminal coupled to the output port, a second terminal coupled to the first tank circuit, and a gate; a first low-side sync FET comprising a first terminal coupled to the second terminal of the first high-side sync FET and to the first tank circuit, a second terminal, and a gate; and a first current sense circuit coupled to the first tank circuit.

In accordance with at least one example of the disclosure, a switched capacitor voltage converter comprises: an input port; an output port; a first control field-effect transistor (FET) comprising a first terminal coupled to the input port, a second terminal, and a gate; a second control FET comprising a first terminal coupled to the second terminal of the first control FET, a second terminal, and a gate; a tank circuit coupled to the second terminal of the first control FET and to the first terminal of the second control FET; a high-side sync FET comprising a first terminal coupled to the output port, a second terminal coupled to the tank circuit, and a gate; a low-side sync FET comprising a first terminal coupled to the second terminal of the high-side sync FET and to the tank circuit, a second terminal, and a gate; a current sense circuit coupled to the tank circuit and configured to determine a direction of current flow in the tank circuit; and a controller coupled to the current sense circuit, the controller configured to provide a first gating signal to the gate of the first control FET and to the gate of the high-side sync FET, and a second gating signal to the gate of the second control FET and to the gate of the low-side sync FET, wherein the controller is configured to adjust a duty cycle of the first gating signal and a duty cycle of the second gating signal.

In accordance with at least one example of the disclosure, a switched capacitor voltage converter comprises: an input port; an output port; a set of serially-connected control field-effect transistors (FETs), a first field-effect transistor (FET) in the set of serially-connected control FETs coupled to the input port; a set of tank circuits coupled to the serially-connected control FETs; a set of rectifier half-bridge circuits coupled to the set of tank circuits, each rectifier half-bridge circuit coupled to the output port; a set of current sense circuits coupled to the set of tank circuits and configured to determine changes in current direction in each tank circuit; and a controller configured to control a switching frequency for the set of serially-connected control FETs and the set of rectifier half-bridge circuits, the controller configured to decrease the switching frequency if a current sense circuit in the set of current sense circuits indicates that a change in current direction occurs after a one-half duty cycle, provided the switched capacitor voltage converter is not in a soft start state.

BRIEF DESCRIPTION OF THE DRAWINGS

For a detailed description of various examples, reference will now be made to the accompanying drawings in which.

DETAILED DESCRIPTION

The use of tank circuits in a Dickson-type switched capacitor voltage converter, where the switching frequency is close to the resonant frequency of the tank circuits, helps to reduce switching loss by creating a soft-switching condition. However, process variation can cause variations in the resonant frequency among the tank circuits, and the impedance of a tank circuit can change as the switching frequency deviates from the resonant frequency. Mismatch among the tank circuit impedances can lead to several performance issues, for example: imbalanced voltage stresses on the switching capacitors (which may require relatively high-voltage rated transistors); relatively high reactive current; and reduction in output power capacity. Some or all of the disclosed embodiments mitigate some or all of these issues, where in accordance with the disclosed embodiments, the switching duty cycles can be varied across the tank circuits in a Dickson-type switched capacitor voltage converter. Furthermore, in accordance with the disclosed embodiments, the switching frequency can be varied.

Figure 1:
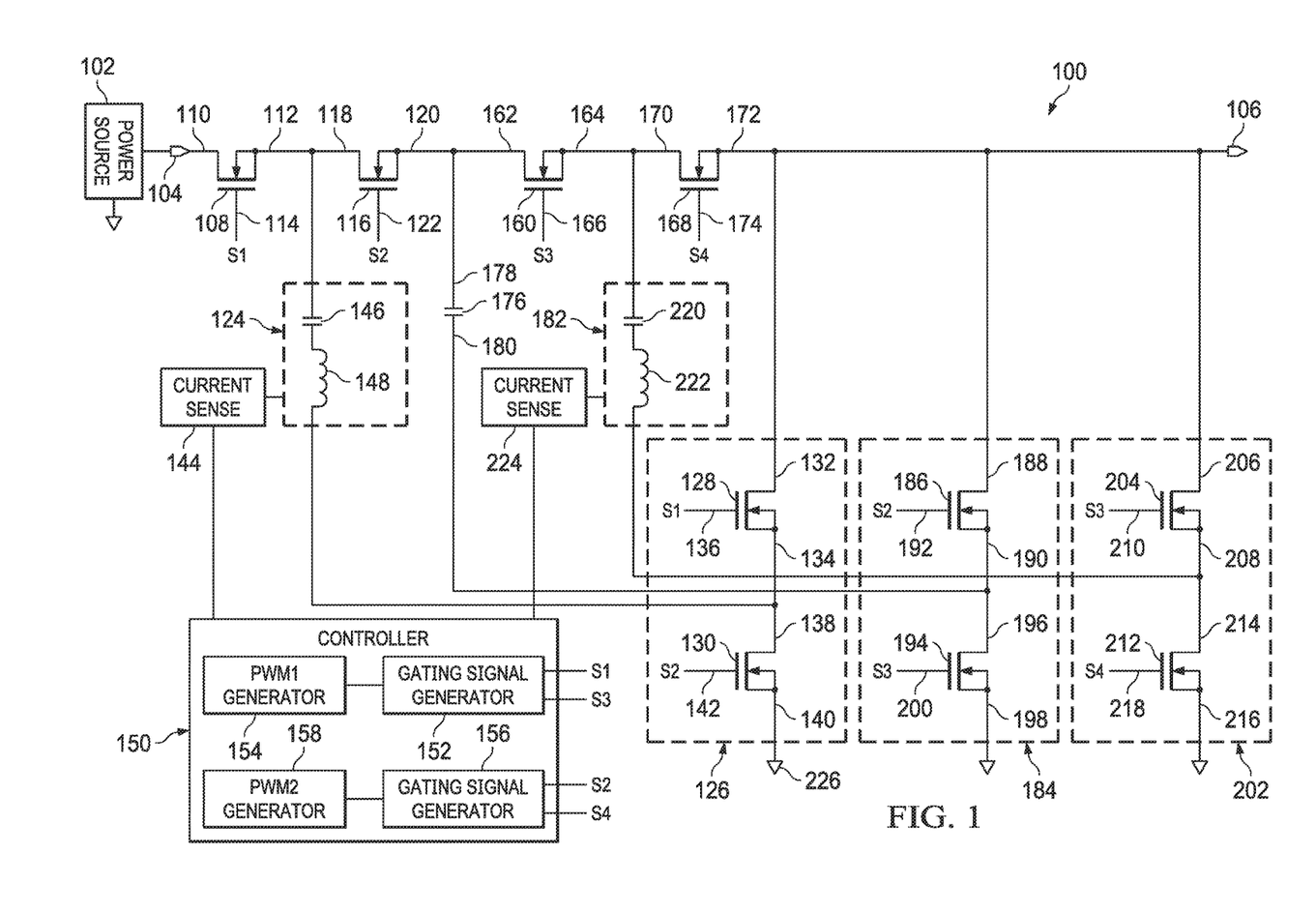
FIG. 1 shows a switched capacitor voltage converter in accordance with various examples.

FIG. 1 shows an illustrative switched capacitor voltage converter 100. The illustrative switched capacitor voltage converter 100 can be referred to as a Dickson-type switched capacitor voltage converter with LC resonant tanks. When the illustrative switched capacitor voltage converter 100 is in operation, a power source 102 is coupled to an input port 104. The power source 102 provides a DC voltage at the input port 104, and the illustrative switched capacitor voltage converter 100 provides a DC output voltage at an output port 106.

The illustrative switched capacitor voltage converter 100 is a step-down converter, and for the particular embodiment of FIG. 1 it is a 4-to-1 step-down converter, where the value of the output voltage provided at the output port 106 is one-fourth the value of the input voltage provided at the input port 104. Embodiments are not limited to converters having a 4-to-1 step-down ratio, and the following description as it applies to the particular embodiment of FIG. 1 is applicable to converters of arbitrary step-down ratios.

The illustrative switched capacitor voltage converter 100 comprises serially-connected field-effect transistors (FETs), where the serially-connected FETs are referred to as control FETs. The illustrative switched capacitor voltage converter 100 comprises a field-effect transistor (FET) 108 comprising a first terminal 110 coupled to the input port 104, a second terminal 112, and a gate 114. A second control FET 116 comprises a first terminal 118 coupled to the second terminal 112 of the first control FET 108, a second terminal 120, and a gate 122.

A first tank circuit 124 is coupled to the second terminal 112 of the first control FET 108 and to the first terminal 118 of the second control FET 116. The first tank circuit 124 is coupled to a first rectifier half-bridge circuit 126. The first rectifier half-bridge circuit 126 comprises two FETs, referred to as sync FETs, specifically a first high-side sync FET 128 and a first low-side sync FET 130. The first high-side sync FET 128 comprises a first terminal 132 coupled to the output port 106, a second terminal 134 coupled to the first tank circuit 124, and a gate 136. The first low-side sync FET 130 comprises a first terminal 138 coupled to the second terminal 134 of the first high-side sync FET 128 and to the first tank circuit 124, a second terminal 140, and a gate 142. A first current sense circuit 144 is coupled to the first tank circuit 124.

The first tank circuit 124 comprises a capacitor 146 and an inductor 148 connected in series, where the capacitor 146 is connected to the second terminal 112 of the first control FET 108, and the inductor 148 is connected to the first terminal 138 of the first low-side sync FET 130. In some embodiments, the coupling order of the capacitor 146 and the inductor 148 are interchanged, where the inductor 148 is connected to the second terminal 112 of the first control FET 108, and the capacitor 146 is connected to the first terminal 138 of the first low-side sync FET 130.

The illustrative switched capacitor voltage converter 100 further comprises a controller 150 coupled to the first current sense circuit 144. The first current sense circuit 144 provides to the controller 150 a signal indicative of the direction of current flowing through the first tank circuit 124. In some embodiments, the algebraic sign of the current flowing through the first tank circuit 124 is positive when current in the first tank circuit 124 flows to the first rectifier half-bridge circuit 126 and is negative when the current flows from the first rectifier half-bridge circuit 126 to the first tank circuit 124. The convention for choosing the algebraic sign is arbitrary and a matter of circuit design.

The controller 150 is configured to provide a first gating signal, labeled S1, to the gate 114 of the first control FET 108 and to the gate 136 of the first high-side sync FET 128, and a second gating signal, labeled S2, to the gate 122 of the second control FET 116 and to the gate 142 of the first low-side sync FET 130.

The controller 150 includes a first gating signal generator 152 to provide the first gating signal S1 to turn on the first control FET 108 and the first high-side sync FET 128 in response to a turn-on edge of a first pulse width modulation (PWM) signal provided by a first PWM generator 154. The controller 150 further provides the first gating signal S1 to turn off the first control FET 108 and the first high-side sync FET 128 in response to a turn-off edge of the first PWM signal or the first current sense circuit 144 detecting a change in direction of the current flow in the first tank circuit 124, whichever occurs first. A change in the direction of the current flow is also referred to as a zero-crossing point of the current flow. For the convention in which a positive current flow in the first tank circuit 124 is in a direction towards the first rectifier half-bridge circuit 126, a change in current flow is detected when the algebraic sign of the current flow changes from positive to negative.

The controller 150 includes a second gating signal generator 156 to provide the second gating signal S2 to turn on the second control FET 116 and the first low-side sync FET 130 in response to a turn-on edge of a second PWM signal generated by a second PWM generator 158. The controller 150 further provides the second gating signal S2 to turn off the second control FET 116 and the first low-side sync FET 130 in response to a turn-off edge of the second PWM signal or the first current sense circuit 144 detecting a change in direction of the current flow in the first tank circuit 124, whichever occurs first.

The turn-on edge of the first PWM signal is shifted 180° with respect to the turn-on edge of the second PWM signal. Accordingly, for the convention in which a positive current flow in the first tank circuit 124 is in a direction towards the first rectifier half-bridge circuit 126, the controller 150 provides the second gating signal S2 to turn off the second control FET 116 and the first low-side sync FET 130 in response to the earliest of the turn-off edge of the second PWM signal or the first current sense circuit 144 detecting a change in current flow, where a change in current flow is detected when the algebraic sign of the current flow changes from negative to positive.

The illustrative switched capacitor voltage converter 100 further comprises a third control FET 160 comprising a first terminal 162 coupled to the second terminal 120 of the second control FET 116, a second terminal 164, and a gate 166; and a fourth control FET 168 comprising a first terminal 170 coupled to the second terminal 164 of the third control FET 160, a second terminal 172, and a gate 174. The illustrative switched capacitor voltage converter 100 further comprises a capacitor 176 comprising a first terminal 178 coupled to the second terminal 120 of the second control FET 116 and to the first terminal 162 of the third control FET 160, and comprising a second terminal 180; and a second tank circuit 182 coupled to the second terminal 164 of the third control FET 160 and to the first terminal 170 of the fourth control FET 168. The capacitor 176 can be referred to as a flying capacitor 176.

The illustrative switched capacitor voltage converter 100 further comprises a second rectifier half-bridge circuit 184 coupled to the capacitor 176. The second rectifier half-bridge circuit 184 comprises a second high-side sync FET 186 comprising a first terminal 188 coupled to the output port 106, a second terminal 190 coupled to the second terminal 180 of the capacitor 176, and a gate 192; and a second low-side sync FET 194 comprising a first terminal 196 coupled to the second terminal 190 of the second high-side sync FET 186 and to the second terminal 180 of the capacitor 176, a second terminal 198, and a gate 200.

The illustrative switched capacitor voltage converter 100 further comprises a third rectifier half-bridge circuit 202 coupled to the second tank circuit 182. The third rectifier half-bridge circuit 202 comprises a third high-side sync FET 204 comprising a first terminal 206 coupled to the output port 106, a second terminal 208 coupled to the second tank circuit 182, and a gate 210; and a third low-side sync FET 212 comprising a first terminal 214 coupled to the second terminal 208 of the third high-side sync FET 204 and to the second tank circuit 182, a second terminal 216, and a gate 218.

The second tank circuit 182 comprises a capacitor 220 coupled in series with an inductor 222, where the capacitor 220 is connected to the second terminal 164 of the third control FET 160 and the inductor 222 is connected to the third rectifier half-bridge circuit 202. In some embodiments, the coupling order of the capacitor 220 and the inductor 222 is changed, where the inductor 222 is connected to the second terminal 164 of the third control FET 160 and the capacitor 220 is connected to the third rectifier half-bridge circuit 202.

The illustrative switched capacitor voltage converter 100 further comprises a second current sense circuit 224 coupled to the second tank circuit 182. The second current sense circuit 224 provides to the controller 150 a signal indicative of the direction of current flowing through the second tank circuit 182. In some embodiments, the algebraic sign of the current flowing through the second tank circuit 182 is positive when current in the second tank circuit 182 flows to the third rectifier half-bridge circuit 202 and is negative when the current flows from the third rectifier half-bridge circuit 202 to the second tank circuit 182. The convention for choosing the algebraic sign is arbitrary and is a matter of circuit design.

The controller 150 is configured to provide the second gating signal S2 to the second high-side sync FET 186. The controller 150 is further configured to provide a third gating signal, labeled S3, to the gate 166 of the third control FET 160, to the gate 200 of the second low-side sync FET 194, and to the gate 210 of the third high-side sync FET 204. The controller 150 is further configured to provide a fourth gating signal, labeled S4, to the gate 174 of the fourth control FET 168, and to the gate 218 of the third low-side sync FET 212.

The controller 150 is configured so that the first gating signal generator 152 provides the second gating signal S2 to turn on the second high-side sync FET 186 in response to the turn-on edge of the second PWM signal, and to turn off the second high-side sync FET 186 in response to the turn-off edge of the second PWM signal or the first current sense circuit 144 detecting a change in direction of the current flow in the first tank circuit 124, whichever occurs first. For the convention in which a positive current flow in the first tank circuit 124 is in a direction towards the first rectifier half-bridge circuit 126, a detection in the change in current flow to turn off the second high-side sync FET 186 is when the algebraic sign of the current flow in the first tank circuit 124 changes from negative to positive.

The controller 150 is configured so that the first gating signal generator 152 provides the third gating signal S3 to turn on the third control FET 160, the second low-side sync FET 194, and the third high-side sync FET 204 in response to the turn-on edge of the first PWM signal, and to turn off the third control FET 160, the second low-side sync FET 194, and the third high-side sync FET 204 in response to the turn-off edge of the first PWM signal or the second current sense circuit 224 detecting a change in direction of the current flow in the second tank circuit 182. For the convention in which a positive current flow in the second tank circuit 182 is in a direction towards the third rectifier half-bridge circuit 202, a detection in the change in current flow to turn off the third control FET 160, the second low-side sync FET 194, and the third high-side sync FET 204 is when the algebraic sign of the current flow in the second tank circuit 182 changes from positive to negative.

The controller 150 is configured so that the first gating signal generator 152 provides the fourth gating signal S4 to turn on the fourth control FET 168 and the third low-side sync FET 212 in response to the turn-on edge of the second PWM signal, and to turn off the fourth control FET 168 and the third low-side sync FET 212 in response to the turn-off edge of the second PWM signal or the second current sense circuit 224 detecting a change in direction of the current flow in the second tank circuit 182, whichever occurs first. For the convention in which a positive current flow in the second tank circuit 182 is in a direction towards the third rectifier half-bridge circuit 202, a detection in the change in current flow to turn off the fourth control FET 168 and the third low-side sync FET 212 is when the algebraic sign of the current flow in the second tank circuit 182 changes from negative to positive.

A ground 226 is coupled to the second terminal 140 of the first low-side sync FET 130, the second terminal 198 of the second low-side sync FET 194, and the second terminal 216 of the third low-side sync FET 212.

Because the illustrative switched capacitor voltage converter 100 of FIG. 1 has a 4-to-1 step-down ratio, there are a total of four control FETs, where the second terminal 172 of the fourth control FET 168 is connected to the output port 106. The embodiment of the illustrative switched capacitor voltage converter 100 is easily generalized to switched capacitor voltage converters having an arbitrary step-down ratio of n-to-1, where n is an integer. A switched capacitor voltage converter with a step-down ratio of n-to-1 has n control FETs, where the second terminal of each odd-labeled control FET (assuming labeling begins with the number 1, starting from the control FET directly coupled to the input port) is coupled to a tank circuit, and the second terminal of each even-labeled control FET is coupled to a flying capacitor. There are n-1 rectifier half-bridge circuits, each with a high-side sync FET and a low-side sync FET. Each tank circuit and each flying capacitor are coupled to a corresponding rectifier half-bridge circuit.

For a switched capacitor voltage converter with a step-down ratio of n-to-1, there is a current sense circuit for each tank circuit. The current sense circuits provide signals to a controller indicative of the current direction (or zero-crossing) for their respective tank circuits. The controller generates n gating signals, with the gating signals distributed to the control FETs, the high-side sync FETs, and the low-side sync FETs in similar fashion as described with respect to FIG. 1 but generalized to an arbitrary step-down ratio of n-to-1. The odd-labeled gating signals (their labels corresponding to their respective control FETs) are generated from the first PWM signal, and the even-labeled gating signals (their labels corresponding to their respective control FETs) are generated from the second PWM signal, as described with respect to FIG. 1 but generalized to an arbitrary step-down ratio of n-to-1.

For some embodiments, the first and second PWM signals each have a duty cycle less than 50%, and each have a same frequency. The gating signals provided by the controller 150 each have the same frequency.

Figure 2:
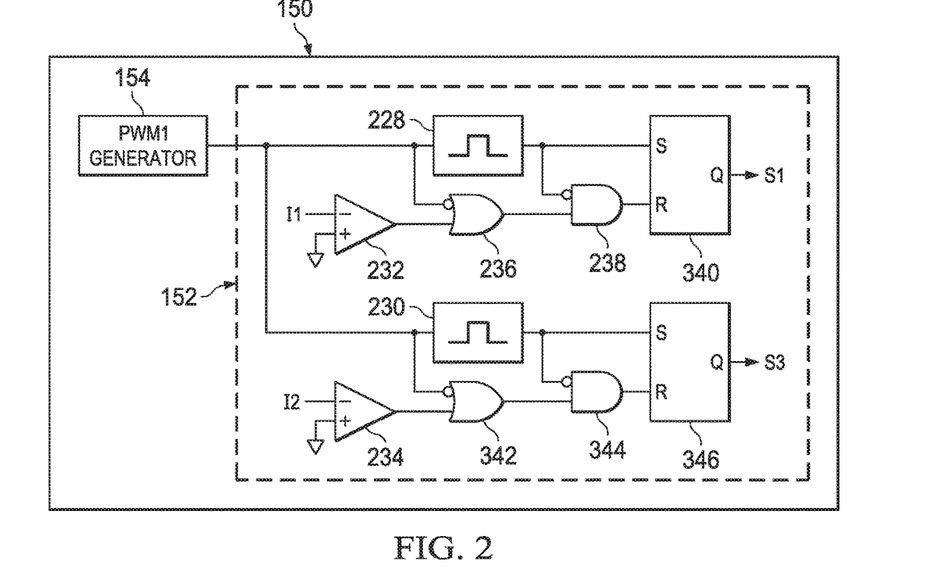
FIG. 2 shows an embodiment of a controller for a switched capacitor voltage converter in accordance with various examples.

FIG. 2 shows an embodiment of the controller 150, but for simplicity of illustration FIG. 2 does not show the second PWM generator 158 and the second gating signal generator 156. The first gating signal generator 152 includes a first one-shot trigger 228 and a second one-shot trigger 230, where the first PWM generator 154 provides the first PWM signal as input to the first one-shot trigger 228 and to the second one-shot trigger 230. A signal I1 denotes the signal provided by the first current sense circuit 144 indicative of the current flowing through the first tank circuit 124, and this signal is provided as input to a first comparator 232. A signal I2 denotes the signal provided by the second current sense circuit 224 indicative of the current flowing through the second tank circuit 182, and this signal is provided as input to a second comparator 234.

The first comparator 232 provides its logical output value as an input to a first logic gate 236, and the first PWM signal is provided as an input to the first logic gate 236. The first logic gate 236 applies the logical OR operation to the logical output of the first comparator 232 and the logical inverse of the first PWM signal. The logical output of the first logic gate 236 is provided as an input to a second logic gate 238, and the logical output of the first one-shot trigger 228 is provided as an input to the second logic gate 238. The second logic gate 238 applies the logical AND operation to the logical inverse of the logical output of the first one-shot trigger 228 and the logical output of the first logic gate 236.

The logical output of the first one-shot trigger 228 is provided as input to an SR latch 340, and the second logic gate 238 provides its logical output as an input to the SR latch 340. The first gating signal S1 is the logical output of the SR latch 340.

A third logic gate 342, a fourth logic gate 344, and an SR latch 346 are each similar to their corresponding counterparts, respectively, the first logic gate 236, the second logic gate 238, and the SR latch 340. Accordingly, a detailed explanation of their behavior need not be included.

Figure 3:
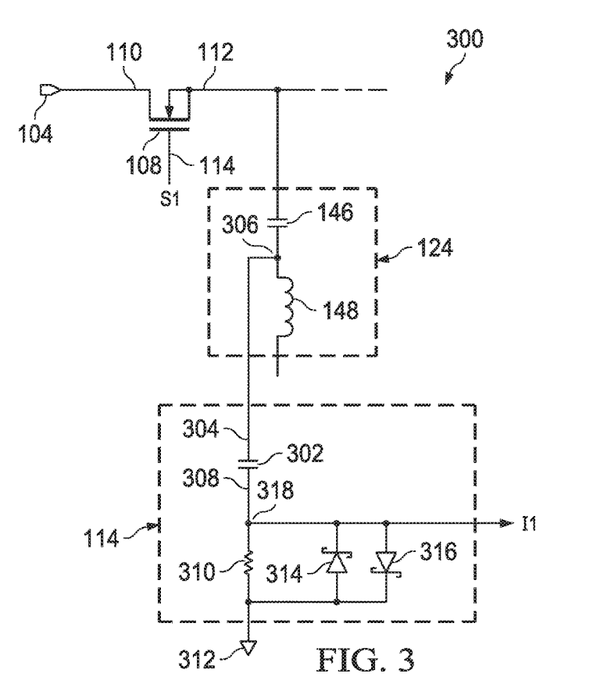
FIG. 3 shows a switched capacitor voltage converter in accordance with various examples.

FIG. 3 shows an illustrative switched capacitor voltage converter 300, such as for example the illustrative switched capacitor voltage converter 100 of FIG. 1, where FIG. 3 shows an embodiment for the first current sense circuit 144. For ease of illustration, FIG. 3 does not show all components in an embodiment of a switched capacitor voltage converter.

Referring to FIG. 3, the first current sense circuit 144 comprises a capacitor 302 with a terminal 304 coupled to a common node 306 of the first tank circuit 124. A terminal 308 of the capacitor 302 is coupled to a resistor 310 that is grounded (312). Schottky diodes 314 and 316 are coupled in parallel with the resistor 310 to provide a clamping action for large swings in signal amplitude. The signal I1 developed at a node 318 is indicative of current flow through the first tank circuit 124.

Figure 4:
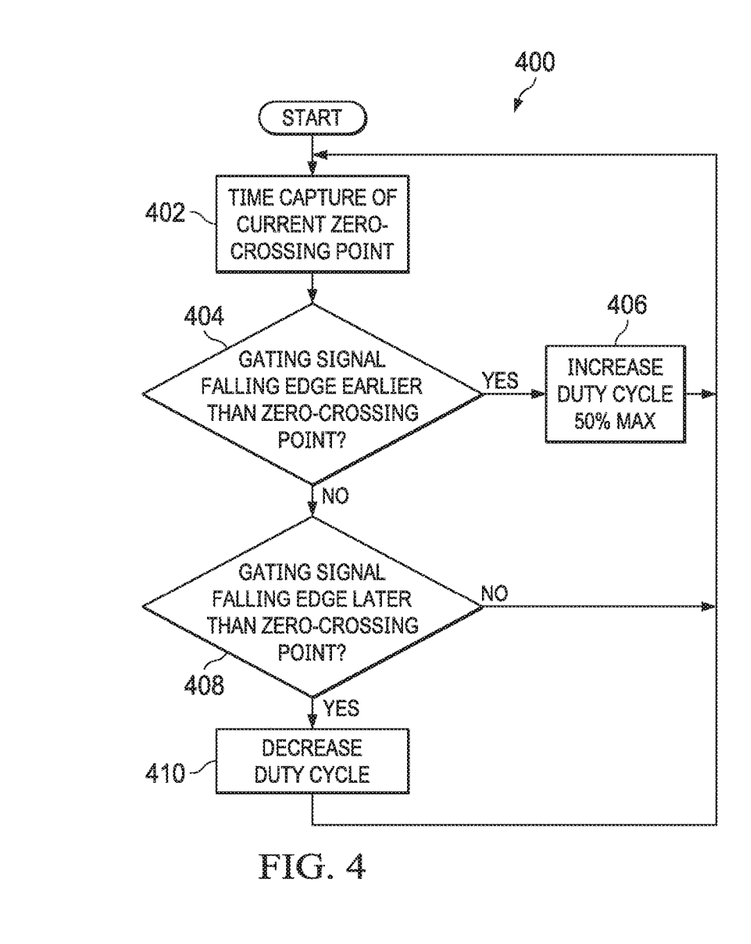
FIG. 4 shows a controller method for a switched capacitor voltage converter in accordance with various examples.

FIG. 4 shows an illustrative method 400 of a controller for a switched capacitor voltage converter. A controller according to the illustrative method 400 can adjust the duty cycle for each tank circuit. Accordingly, the set of steps illustrated for the illustrative method 400 can be instantiated for each tank circuit. A controller performing the illustrative method 400 is configured to provide a first gating signal S1 to the gate 114 of the first control FET 108 and to the gate 136 of the first high-side sync FET 128, and a second gating signal S2 to the gate 122 of the second control FET 116 and to the gate 142 of the first low-side sync FET 130. The controller adjusts a duty cycle of the first gating signal S1 and a duty cycle of the second gating signal S2 according to the illustrative method 400, where the illustrative method 400 is instantiated for the first gating signal S1 and is instantiated for the second gating signal S2.

A switched capacitor voltage converter performing instantiations of the illustrative method 400 is configured to provide the first gating signal S1 to turn on the first control FET 108 and the first high-side sync FET 128 in response to the turn-on edge of the first PWM signal, provide the first gating signal S1 to turn off the first control FET 108 and the first high-side sync FET 128 based on the duty cycle of the first gating signal S1, increase the duty cycle of the first gating signal S1 up to a maximum of one-half in response to the first gating signal S1 having a falling edge occurring before the first current sense circuit 144 detecting a change in direction of the current flow in the first tank circuit 124, and decrease the duty cycle of the first gating signal S1 in response to the first gating signal S1 having a falling edge occurring after the first current sense circuit 144 detecting a change in direction of the current flow in the first tank circuit 124.

A switched capacitor voltage converter performing instantiations of the illustrative method 400 is further configured to provide the second gating signal S2 to turn on the second control FET 116 and the first low-side sync FET 130 in response to the turn-on edge of the second PWM signal, provide the second gating signal S2 to turn off the second control FET 116 and the first low-side sync FET 130 based on the duty cycle of the second gating signal S2, increase the duty cycle of the second gating signal S2 up to a maximum of one-half in response to the second gating signal S2 having a falling edge occurring before the first current sense circuit 144 detecting a change in direction of the current flow in the first tank circuit 124, and decrease the duty cycle of the second gating signal S2 in response to the second gating signal S2 having a falling edge occurring after the first current sense circuit 144 detecting a change in direction of the current flow in the first tank circuit 124.

In step 402 of FIG. 4, a controller performs a time capture of the zero-crossing point of current in a tank circuit. Associated with the tank circuit is a gating signal, where the turn off edge of the gating signal depends upon current flow in the tank circuit. In step 404, a determination is made as to whether the gating signal associated with the tank circuit has a falling edge occurring a first time interval earlier than the zero-crossing point of the current. The value of the first time interval can be chosen to improve noise immunity of the illustrative method 400. To simplify the discussion, the first time interval is not explicitly referred to FIG. 4, so that step 404 refers to determining whether the gating signal has a falling edge earlier than the current zero-crossing point.

If in step 404 it is determined that the gating signal has a falling edge earlier than the zero-crossing point of the current in the tank circuit, then in step 406 the duty cycle of the gating signal is increased by some predetermined amount, up to a maximum of 50%. If in step 404 it is determined that the gating signal does not have a falling edge earlier than the zero-crossing point of the current, then in step 408 a determination is made as to whether the gating signal has a falling edge occurring a second time interval later than the zero-crossing point of the current in the tank circuit. The value of the second time interval need not be the same as the value of the first time interval and can be chosen to improve the noise immunity of the illustrative method 400. To simplify the discussion, the second time interval is not explicitly referred to in FIG. 4, so that step 408 refers to determining whether the gating signal has a falling edge later than the current zero-crossing point.

If in step 408 it is determined that the gating signal has a falling edge later than the zero-crossing point of the current in the tank circuit, then in step 410 the duty cycle of the gating signal is decreased by some predetermined amount.

In some embodiments, the controller can be configured as a finite state machine to implement the instantiations of the illustrative method 400, and some or all of the steps can be stored in a memory as firmware.

As discussed previously, the embodiment of FIG. 1 is readily generalized to embodiments having an arbitrary step-down ratio of n-to-1 (where n is even), where a first control FET in a set of serially-connected control FETs is coupled to the input port of the switched capacitor voltage converter, and a last control FET in the set of serially-connected control FETs is coupled to the output port of the switched capacitor voltage converter. A set of tank circuits is coupled to the serially-connected control FETs, and a set of rectifier half-bridge circuits is coupled to the set of tank circuits, where each rectifier half-bridge circuit is coupled to the output port. A set of current sense circuits is coupled to the set of tank circuits to determine changes in current direction in each tank circuit.

In some embodiments of a switched capacitor voltage converter having an arbitrary step-down ratio of n-to-1 (where n is even), the controller controls (tunes) a switching frequency for the set of serially-connected control FETs and the set of rectifier half-bridge circuits. The controller is configured to decrease the switching frequency if any current sense circuit in the set of current sense circuits indicates that a change in current direction occurs after a one-half duty cycle, provided the switched capacitor voltage converter is not in a soft start state. In some embodiments, the controller is further configured to increase the switching frequency if each current sense circuit in the set of current sense circuits indicates that the current direction in each tank circuit occurs before the one-half duty cycle, provided the switched capacitor voltage converter is not in a soft start state.

Figure 5:
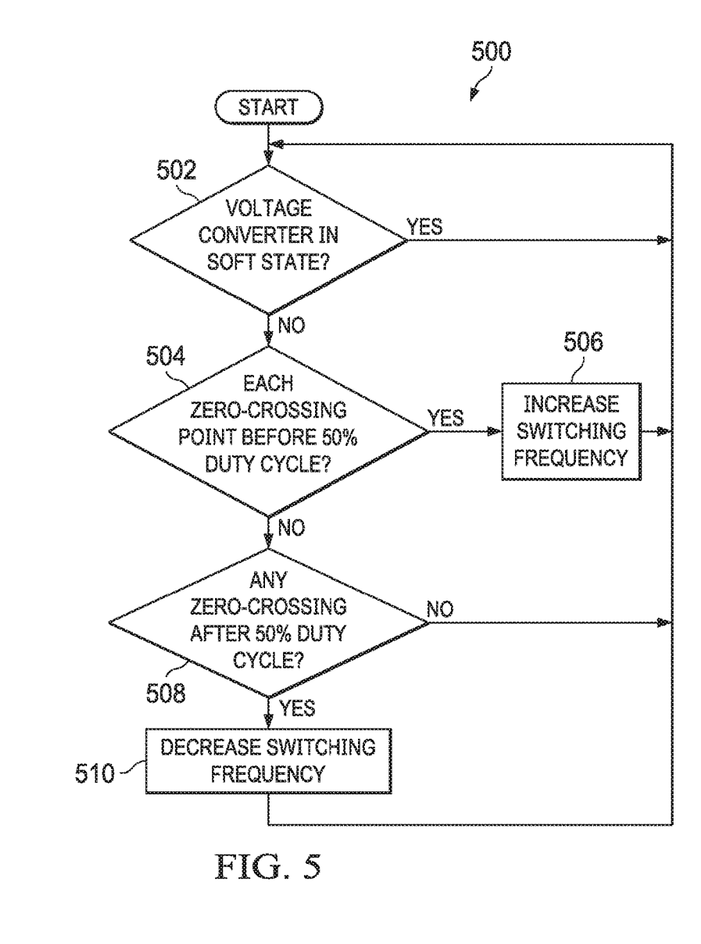
FIG. 5 shows a controller method for a switched capacitor voltage converter in accordance with various examples.

FIG. 5 shows an illustrative method 500 of a controller for a switched capacitor voltage converter, where the switching frequency of the first and second PWM signals is controlled (tuned). The steps following step 502 are performed only if step 502 determines that the switched capacitor voltage converter is not in a soft state. Step 504 determines whether each zero-crossing point of the current in each tank circuit occurs earlier than a 50% duty cycle. If step 504 results in the affirmative, then in step 506 the switching frequency is increased. If step 504 results in the negative, then step 508 determines whether any tank circuit has a zero-crossing point after a 50% duty cycle. If step 508 results in the affirmative, then in step 510 the switching frequency is decreased. If step 508 results in the negative, then the illustrative method 500 continues as indicated in FIG. 5.

Figure 6:
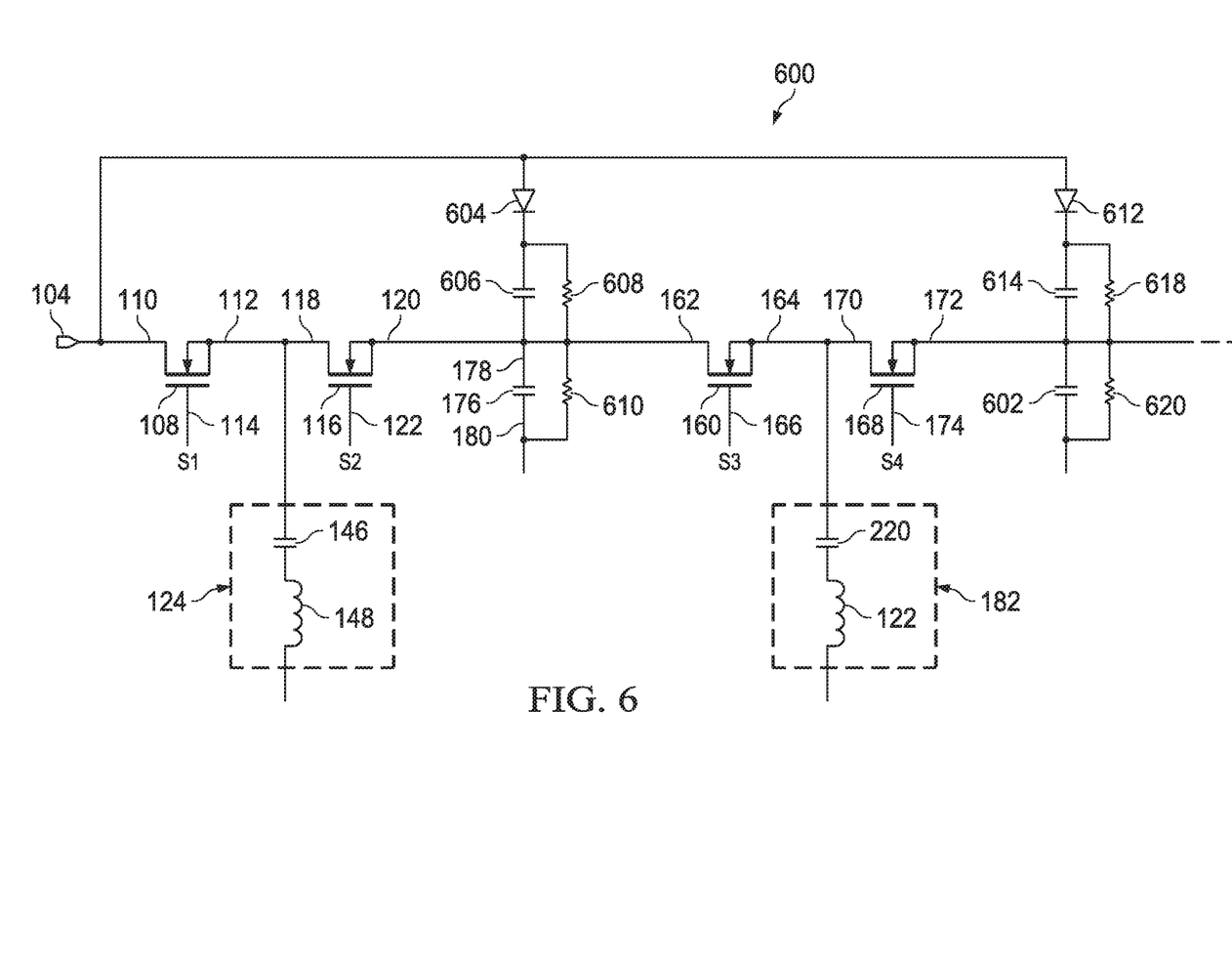
FIG. 6 shows a switched capacitor voltage converter in accordance with various examples.

FIG. 6 shows an illustrative switched capacitor voltage converter 600, where not all components are shown. Corresponding components in FIG. 1 and FIG. 6 share the same corresponding labels, but the illustrative switched capacitor voltage converter 600 has an arbitrary step-down ratio of n-to-1, where the integer n is an even number greater than 4. For ease of illustration, FIG. 6 shows only four control FETs: 108, 116, 160, and 168. The illustrative switched capacitor voltage converter 600 is similar in structure to the embodiment of FIG. 1, but the illustrative switched capacitor voltage converter 600 has an architecture appropriate for a step-down ratio of n-to-1 with n greater than 4 and includes n/2 pre-charge circuits, one pre-charge circuit for each flying capacitor. Because the illustration of FIG. 6 shows only two (flying) capacitors, the capacitor 176 and the capacitor 602, only two pre-charge circuits are shown.

A first pre-charge circuit comprises a diode 604 coupled in series with a feedforward capacitor 606, where the anode of the diode 604 is coupled to the input port 104, and the feedforward capacitor 606 is coupled to the (flying) capacitor 176. The first pre-charge circuit further comprises a resistor 608 coupled in parallel with the feedforward capacitor 606, and a resistor 610 coupled in parallel with the capacitor 176. A second pre-charge circuit comprises a diode 612 coupled in series with a feedforward capacitor 614, where the anode of the diode 612 is coupled to the input port 104, and the feedforward capacitor 614 is coupled to the (flying) capacitor 602. The second pre-charge circuit further comprises a resistor 618 coupled in parallel with the feedforward capacitor 614, and a resistor 620 coupled in parallel with the capacitor 602.

The feedforward capacitors 606 and 614 provide current paths to pre-charge their respective switching (flying) capacitors to which they are coupled (e.g., the capacitors 176 and 602) when a power source is coupled to the input port 104. The feedforward capacitors 606 and 614 can be sized proportionally such that when the input voltage at the input port 104 reaches a steady state value, the pre-charged voltages across their respective switching capacitors also reach their steady state values proportional to the input voltage. The switching capacitors in the tank circuits (e.g., the capacitor 146 and the capacitor 220) also can be pre-charged at the same time through the anti-parallel diodes inherent in their adjacent control FETs.

The resistors in the pre-charge circuits can be sized proportionally such that they can maintain the pre-charge voltage levels when the illustrative switched capacitor voltage converter 600 is not switching. The resistors in the pre-charge circuits bleed out the energy stored in the capacitors to which they are coupled when a power source is disconnected from the input port 104. In some embodiments, the low-side sync FETs are turned on during a pre-charge so as to avoid pre-charging an output capacitor (not shown) connected to the output port 106.

The voltage stresses on each pair of control FETs (coupled to a tank circuit) are evenly distributed, so that relatively low-voltage rated control FETs can be used to improve performance. For each feedforward capacitor, a diode (e.g., the diode 604 and the diode 612) is used to block reverse current during normal operation because flying capacitors' reference nodes are switched by the sync FETs.

In some embodiments, an input blocking device to the illustrative switched capacitor voltage converter 600 is not used. In some embodiments, a soft start procedure can be implemented with a duty cycle ramp-up procedure, where for example the duty cycle of the first and second PWM signals ramp up from 0 to a steady state (near but not greater than 50%).

In some embodiments, the control and sync FETs are each an n-type metal-oxide-semiconductor field-effect transistor (nMOSFET), where the "first terminal" of each control or sync FET is a drain, and the "second terminal" of each control or sync FET is a source.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A switched capacitor voltage converter comprising:
an input port;
an output port;
a first control field-effect transistor (FET) comprising a first terminal coupled to the input port, a second terminal, and a gate;
a second control FET comprising a first terminal coupled to the second terminal of the first control FET, a second terminal, and a gate;
a first tank circuit coupled to the second terminal of the first control FET and to the first terminal of the second control FET;
a first high-side sync FET comprising a first terminal coupled to the output port, a second terminal coupled to the first tank circuit, and a gate;
a first low-side sync FET comprising a first terminal coupled to the second terminal of the first high-side sync FET and to the first tank circuit, a second terminal, and a gate;
a first current sense circuit coupled to the first tank circuit, the first current sense circuit configured to determine a direction of current flow in the first tank circuit; and
a controller configured to:
provide the first gating signal to turn on the first control FET and the first high-side sync FET in response to a turn-on edge of a first pulse width modulation (PWM) signal, and to turn off the first control FET and the first high-side sync FET in response to a turn-off edge of the first PWM signal or the first current sense circuit detecting a change in direction of the current flow in the first tank circuit; and
provide the second gating signal to turn on the second control FET and the first low-side sync FET in response to a turn-on edge of a second PWM signal, and to turn off the second control FET and the first low-side sync FET in response to a turn-off edge of the second PWM signal or the first current sense circuit detecting a change in direction of the current flow in the first tank circuit.

2. The switched capacitor voltage converter of claim 1, wherein the controller is coupled to the first current sense circuit, the controller is configured to provide a first gating signal to the gate of the first control FET and to the gate of the first high-side sync FET, and a second gating signal to the gate of the second control FET and to the gate of the first low-side sync FET.

3. The switched capacitor voltage converter of claim 1, wherein the turn-on edge of the first PWM signal is shifted 180° with respect to the turn-on edge of the second PWM signal.

4. The switched capacitor voltage converter of claim 3, further comprising:
a ground, wherein the second terminal of the first low-side sync FET is coupled to the ground.

5. The switched capacitor voltage converter of claim 4, further comprising:
a power source coupled to the input port.

6. The switched capacitor voltage converter of claim 3, further comprising:
a third control FET comprising a first terminal coupled to the second terminal of the second control FET, a second terminal, and a gate;
a fourth control FET comprising a first terminal coupled to the second terminal of the third control FET, a second terminal, and a gate;
a capacitor comprising a first terminal coupled to the second terminal of the second control FET and to the first terminal of the third control FET, and comprising a second terminal;
a second tank circuit coupled to the second terminal of the third control FET and to the first terminal of the second control FET;
a second high-side sync FET comprising a first terminal coupled to the output port, a second terminal coupled to the second terminal of the capacitor, and a gate;
a second low-side sync FET comprising a first terminal coupled to the second terminal of the second high-side sync FET and to the second terminal of the capacitor, a second terminal, and a gate;
a third high-side sync FET comprising a first terminal coupled to the output port, a second terminal coupled to the second tank circuit, and a gate;
a third low-side sync FET comprising a first terminal coupled to the second terminal of the third high-side sync FET and to the second tank circuit, a second terminal, and a gate; and
a second current sense circuit coupled to the second tank circuit.

7. The switched capacitor voltage converter of claim 6, the controller coupled to the second current sense circuit, the controller configured to:
provide the second gating signal to the second high-side sync FET;
provide a third gating signal to the gate of the third control FET, to the gate of the second low-side sync FET, and to the gate of the third high-side sync FET; and
provide a fourth gating signal to the gate of the fourth control FET, and to the gate of the third low-side sync FET.

8. The switched capacitor voltage converter of claim 7, the second current sense circuit to determine a direction of current flow in the second tank circuit, the controller configured to:
provide the second gating signal to turn on the second high-side sync FET in response to the turn-on edge of the second PWM signal, and to turn off the second high-side sync FET in response to the turn-off edge of the second PWM signal or the first current sense circuit detecting a change in direction of the current flow in the first tank circuit;
provide the third gating signal to turn on the third control FET, the second low-side sync FET, and the third high-side sync FET in response to the turn-on edge of the first PWM signal, and to turn off the third control FET, the second low-side sync FET, and the third high-side sync FET in response to the turn-off edge of the first PWM signal or the second current sense circuit detecting a change in direction of the current flow in the second tank circuit; and
provide the fourth gating signal to turn on the fourth control FET, and the third low-side sync FET in response to the turn-on edge of the second PWM signal, and to turn off the fourth control FET, and the third low-side sync FET in response to the turn-off edge of the second PWM signal or the second current sense circuit detecting a change in direction of the current flow in the second tank circuit.

9. The switched capacitor voltage converter of claim 8, further comprising:

a ground coupled to the second terminal of the first low-side sync FET, the second terminal of the second low-side sync FET, and the second terminal of the third low-side sync FET.

10. The switched capacitor voltage converter of claim 9, further comprising:
a power source coupled to the input port.

11. A switched capacitor voltage converter comprising:
an input port;
an output port;
a set of serially-connected control field-effect transistors (FETs), a first field-effect transistor (FET) in the set of serially-connected control FETs coupled to the input port;
a set of tank circuits coupled to the serially-connected control FETs;
a set of rectifier half-bridge circuits coupled to the set of tank circuits, each rectifier half-bridge circuit coupled to the output port;
a set of current sense circuits coupled to the set of tank circuits and configured to determine changes in current direction in each tank circuit; and
a controller configured to control a switching frequency for the set of serially-connected control FETs and the set of rectifier half-bridge circuits, the controller configured to decrease the switching frequency if a current sense circuit in the set of current sense circuits indicates that a change in current direction occurs after a one-half duty cycle, provided the switched capacitor voltage converter is not in a soft start state.

12. The switched capacitor voltage converter of claim 11, the controller further configured to increase the switching frequency if each current sense circuit in the set of current sense circuits indicates that the current direction in each tank circuit occurs before the one-half duty cycle, provided the switched capacitor voltage converter is not in a soft start state.

13. The switched capacitor voltage converter of claim 12, further comprising a power source coupled to the input port.

* * * * *